(12) United States Patent
Neubauer

(10) Patent No.: US 6,309,205 B1
(45) Date of Patent: Oct. 30, 2001

(54) DEVICE FOR PRODUCING CROSS-FINNED PIPES

(75) Inventor: Gerhard Neubauer, Königsberg (DE)

(73) Assignee: Unicor GmbH Rahn Plastmaschinen (DE)

( * ) Notice: Subject to any disclaimer, the term of this patent is extended or adjusted under 35 U.S.C. 154(b) by 0 days.

(21) Appl. No.: 09/341,061

(22) PCT Filed: Jan. 14, 1998

(86) PCT No.: PCT/DE98/00128

§ 371 Date: Jun. 28, 1999

§ 102(e) Date: Jun. 28, 1999

(87) PCT Pub. No.: WO98/32583

PCT Pub. Date: Jul. 30, 1998

(30) Foreign Application Priority Data

Jan. 25, 1997  (DE) .............................................. 197 02 647

(51) Int. Cl.⁷ .................................................... B29C 47/90
(52) U.S. Cl. .................. 425/233; 425/326.1; 425/336; 425/384; 425/388; 425/392; 425/396
(58) Field of Search ............................... 425/233, 326.1, 425/336, 384, 388, 392, 396

(56) References Cited

U.S. PATENT DOCUMENTS

| | | | |
|---|---|---|---|
| 3,776,679 | * 12/1973 | Hegler | 425/396 |
| 4,492,551 | * 1/1985 | Hegler et al. | 425/326.1 |
| 4,718,844 | 1/1988 | Dickhut et al. | 425/336 |
| 5,059,109 | * 10/1991 | Dickhut et al. | 425/233 |
| 5,141,427 | * 8/1992 | Hegler et al. | 425/233 |
| 5,531,583 | * 7/1996 | Berns | 425/336 |
| 5,573,787 | * 11/1996 | Lupke et al. | 425/336 |
| 6,149,421 | * 11/2000 | Kossner | 425/233 |

FOREIGN PATENT DOCUMENTS

| | | |
|---|---|---|
| 2065048 | 6/1972 | (DE) . |
| 2537184 | 3/1977 | (DE) . |
| 0435446 | 7/1991 | (EP) . |
| 0621120 | 10/1994 | (EP) . |

* cited by examiner

*Primary Examiner*—Nam Nguyen
*Assistant Examiner*—Joseph Leyson
(74) *Attorney, Agent, or Firm*—Bachman & LaPointe, P.C.

(57) ABSTRACT

Described is an apparatus for the production of transversely ribbed tubes, having mold jaw halves which bear against each other along a common mold section and form a mold passage. Each mold jaw half has a cooling passage which is produced directly during the operation of casting the respective mold jaw half, for example by means of a so-called false casting core. The cooling passage extends in the corresponding mold jaw half from a first surface to a second surface so that said core can be easily removed from the casting of the mold jaw half. At the one surface, the cooling passage has a cooling agent feed means and, at a spacing therefrom, a cooling agent discharge means. The second surface which is at a distance therefrom is sealed off by means of a guide and slide element which is fixed to the corresponding mold jaw half.

9 Claims, 7 Drawing Sheets

DEVICE FOR PRODUCING CROSS-FINNED PIPES

BACKGROUND OF THE INVENTION

The invention concerns an apparatus for the production of transversely ribbed tubes, which has mold jaw halves which bear against each other along a common mold section with front faces and form a mold passage, wherein each mold jaw half has a cooling passage.

An apparatus of that kind is known for example from DE 25 37 184 A1. In that known apparatus the cooling passages in the individual mold jaws are embodied by bores which are connected at one end to connections for a cooling agent and which at the other end are sealingly closed. Producing the cooling passages in the mold jaw halves requires precise operations and involves an expenditure of time, which has a corresponding effect on the production costs of the mold jaw halves.

German published specification (DE-AS) No 2 065 048 discloses an apparatus for the production of transversely ribbed tubes, in which the mold jaw halves have both cooling passages and also vacuum passages. In that known apparatus, all those passages are also implemented by means of bores so that in this case also there are the deficiencies which have already been described above in connection with DE 25 37 184 A1.

SUMMARY OF THE INVENTION

The object of the present invention is to provide an apparatus of the kind set forth in the opening part of this specification, wherein the mold jaw halves with the cooling passages can be comparatively easily produced.

In accordance with the invention, in an apparatus of the kind set forth in the opening part of this specification, that object is attained in that the cooling passage of the respective mold jaw half which is produced in a casting procedure has at a first surface a cooling agent feed means and at a spacing therefrom a cooling agent discharge means and, produced directly in the casting procedure, it extends to a second surface, which is different from the first surface, of the corresponding mold jaw half, wherein fixed to the respective second surface is a guide and slide element by which the cooling passage is sealed off at the second surface.

BRIEF DESCRIPTION OF THE DRAWINGS

The invention will now be described in greater detail by means of the following description of an embodiment of the apparatus according to the invention for the production of transversely ribbed tubes, as illustrated in the drawings in which.

DETAILED DESCRIPTION OF PREFERRED EMBODIMENTS

Figure 1:
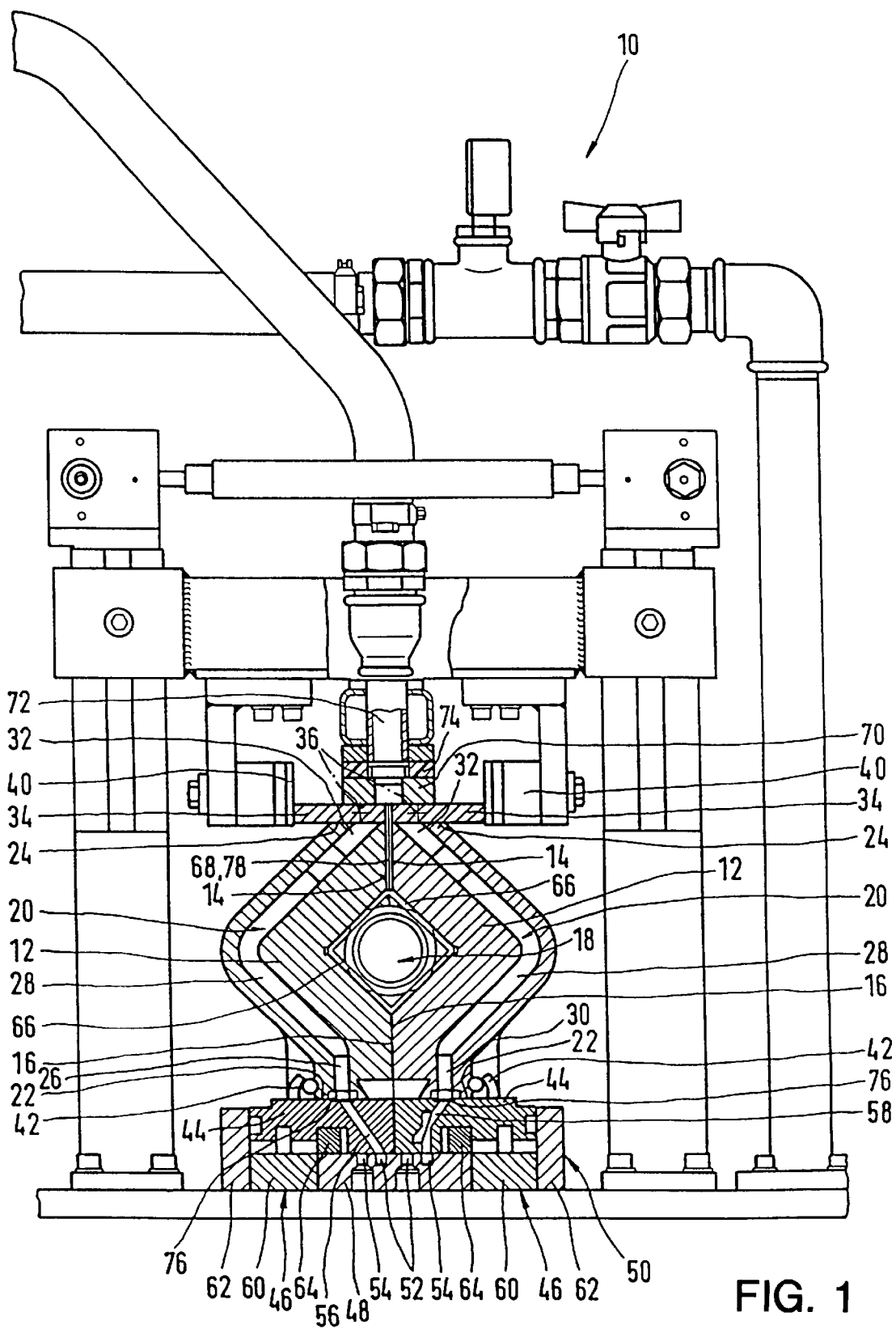
FIG. 1 is a partly sectional front view of an embodiment of the apparatus in the region of its mold section.

In accordance with the invention the cooling passage in the respective mold jaw half is formed for example by means of a so-called false core in the casting mold for casting the respective mold jaw half. After the conclusion of the casting procedure, that false core can be removed without any difficulties from the finished cast mold jaw half, as the cooling passage extends between the first and the second surfaces and is thus accessible from two sides. That means however that, in accordance with the invention, the mold jaw halves can be comparatively easily produced with a cooling passage for a cooling agent such as cooling water. In addition, in accordance with the invention, there is the advantage that the guide and slide elements which are fixed to the second surface of the mold jaw halves not only provide for reliably sealing off the respective cooling passage at the second surface of the corresponding mold jaw half, but at the same time they also serve for precisely guiding the mold jaw halves.

In the apparatus according to the invention, it is preferred if the first and second surfaces of the respective mold jaw half are disposed in mutually opposite relationship and are arranged in mutually parallel relationship and are oriented perpendicularly with respect to the front face of the respective mold jaw half. In accordance with the invention, the mold jaws are preferably disposed in such a way that the front faces of the mold jaw halves are oriented perpendicularly and the first and second surfaces of the mold jaw halves are oriented horizontally.

It is preferred if the respective mold jaw half is connected to a support element which establishes the associated first surface and which is linearly movably guided on a cooling agent bar or rail which is disposed along the common mold section of the mold jaw halves. So that, in the case of a design configuration of the last-mentioned kind, mold jaw sets for transversely ribbed tubes of different cross-sectional and/or longitudinal profile dimensions can be arranged easily without involving a great deal of time, it is preferably if each mold jaw half and the associated support element can be connected together by means of a quick-action clamping device. In order to ensure reliable sealing integrity in respect of the cooling agent between the respective support element and the associated mold jaw half, in relation to such a design configuration of the apparatus according to the invention, it is preferred for a sealing means to be provided between the respective mold jaw half and the associated support element.

It is desirable if each mold jaw half is provided between the mold passage and the second surface of its end face with vacuum communication channels which are in flow communication with vacuum passages, that open into the mold passage, in the respective mold jaw half, and which are prolonged through the associated guide and slide element and which form vacuum communication passages along the common mold section in the guide and slide elements. Vacuum communication channels of that kind can be produced for example by means of a multiple milling tool, in an operation which does not take up a great deal of time.

In an apparatus of the last-mentioned kind it is preferred if provided along the common mold section is a vacuum bar or rail which is in flow communication by way of the vacuum communication passages in the guide and slide elements, with the vacuum passages in the respective mold jaw halves which are disposed at the mold section. Along the common mold section of the mold jaw halves, the vacuum bar or rail bears sealingly against the guide and slide elements of the respective mold jaw halves which are provided at the common mold section. That sealing contact can be further improved by the vacuum bar or rail being elastically yieldingly mounted on a stationary vacuum head. That also makes it possible to compensate for tolerances in respect of height which are due to manufacture of the components and/or which are caused by thermal expansion.

In regard to the apparatus according to the invention it has been found desirable if disposed along the mold section is a guide and cooling agent bar or rail which is provided for guiding the support elements associated with the respective mold jaw halves and which is adapted to provide for a fluid communication of the respective mold jaw halves at the mold section, with cooling agent feed channels and cooling agent discharge channels. Therefore, such a design configuration for the apparatus according to the invention provides for linear guidance by the cooling agent bar or rail, along the first surface, and at the same time a third form of contact with the vacuum bar or rail, at the second surface.

In an apparatus of the last-mentioned kind the cooling agent bar or rail may have a central elongate cooling agent circulation portion and, laterally adjoining same, oil-lubricated guide portions, wherein the elongate cooling agent circulation portion is formed with the cooling agent feed channels and with the cooling agent discharge channels. The central cooling agent circulation portion preferably comprises a sliding or bearing metal alloy, for example bronze. The oil-lubricated elongate guide portions comprise for example high-quality steel. The guide and slide elements as well as the support elements also comprise for example high-quality steel. The mold jaw halves comprise for example aluminum, that is to say a material with a relatively high thermal conduction coefficient so that the cooling agent such as cooling water which flows through the cooling passages of the mold jaw halves disposed at the common mold section produces the optimum effect at the mold passage.

Referring to FIG. 1, shown therein is a partly sectional front view of part of an apparatus 10 for the production of transversely ribbed tubes having mold jaw halves 12 which bear against each other with front faces 14 and 16 along the common mold section which is shown in FIG. 1. The mold jaw halves 12 form a mold passage 18, between the front faces 14 and 16.

Figure 2:
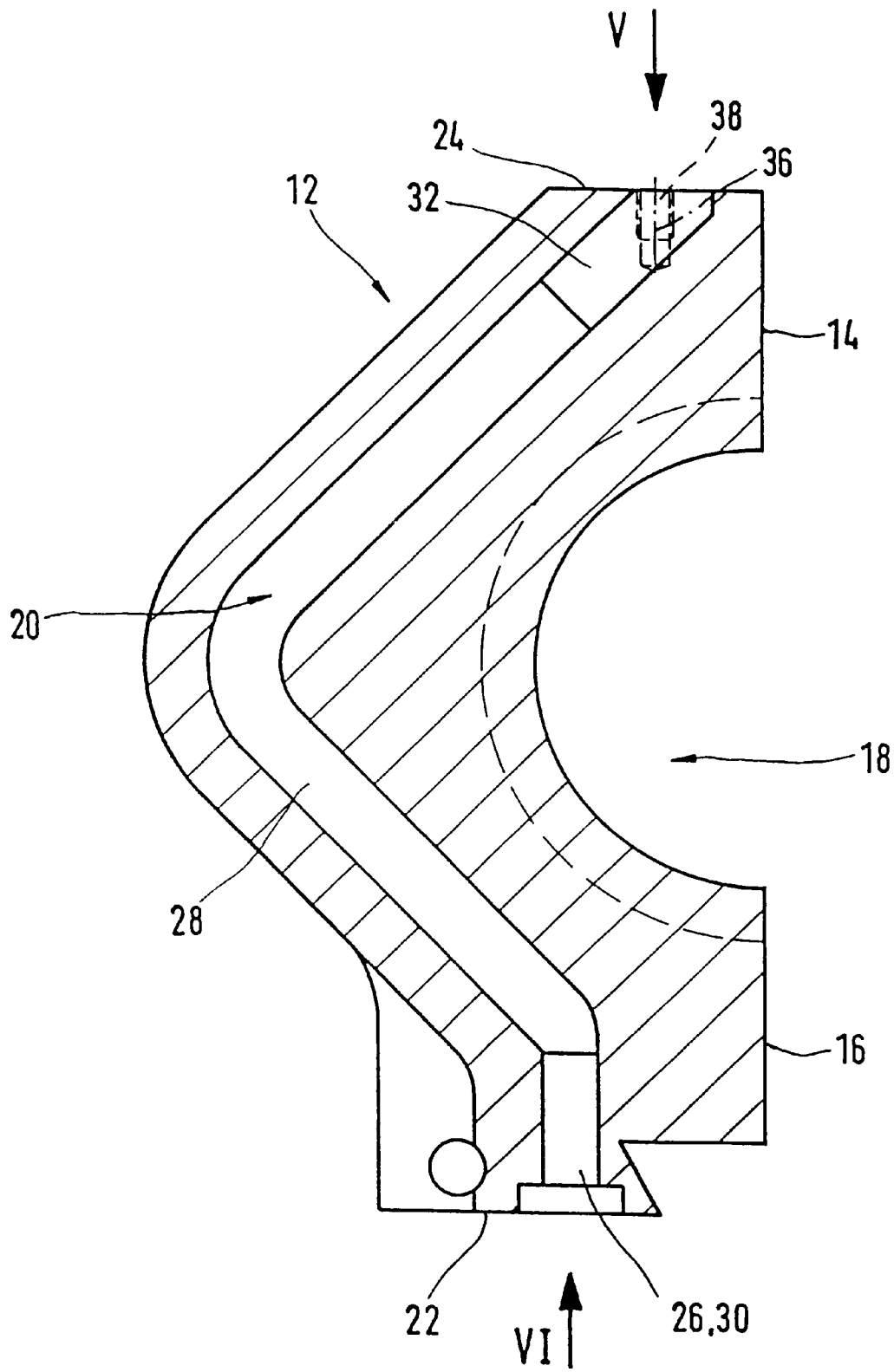
FIG. 2 is a sectional view of a casting blank of a mold jaw half.
Figure 4:
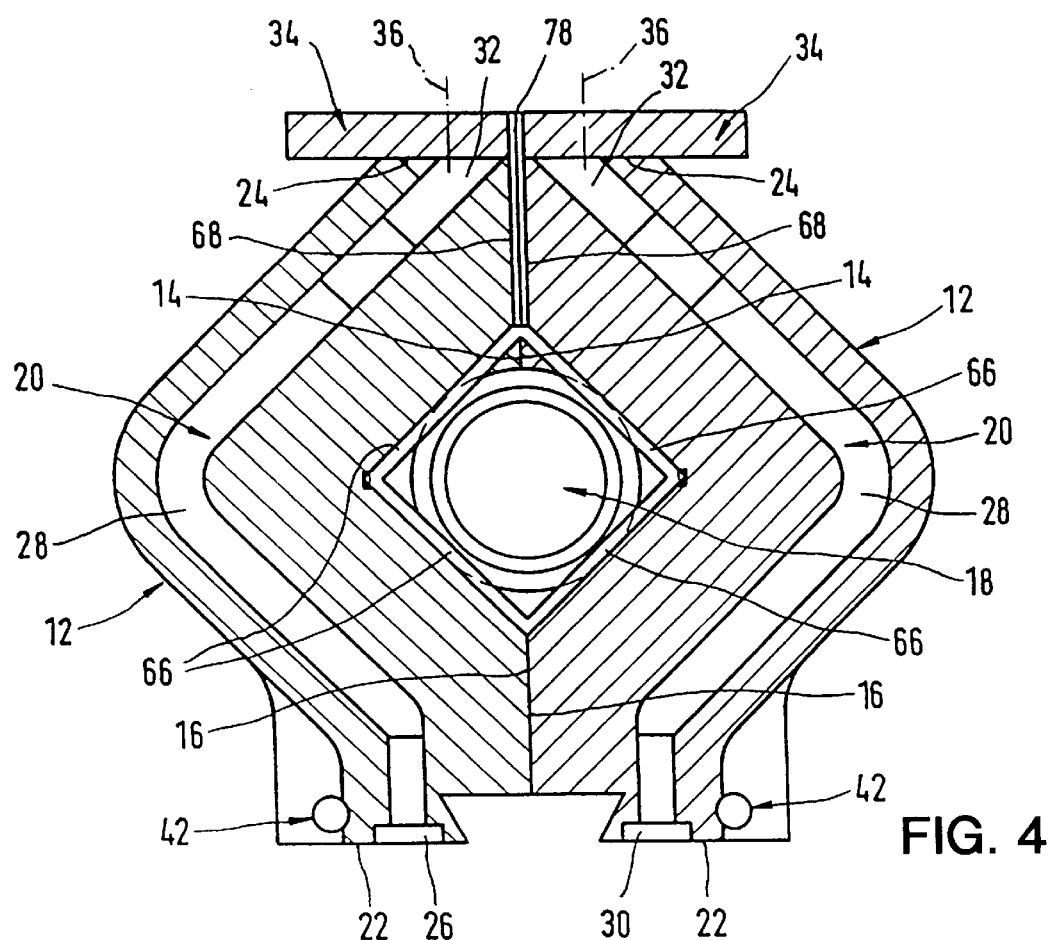
FIG. 4 is a view in section taken along section line IV—IV in FIG. 3, through the two mold jaw halves.
Figure 5:
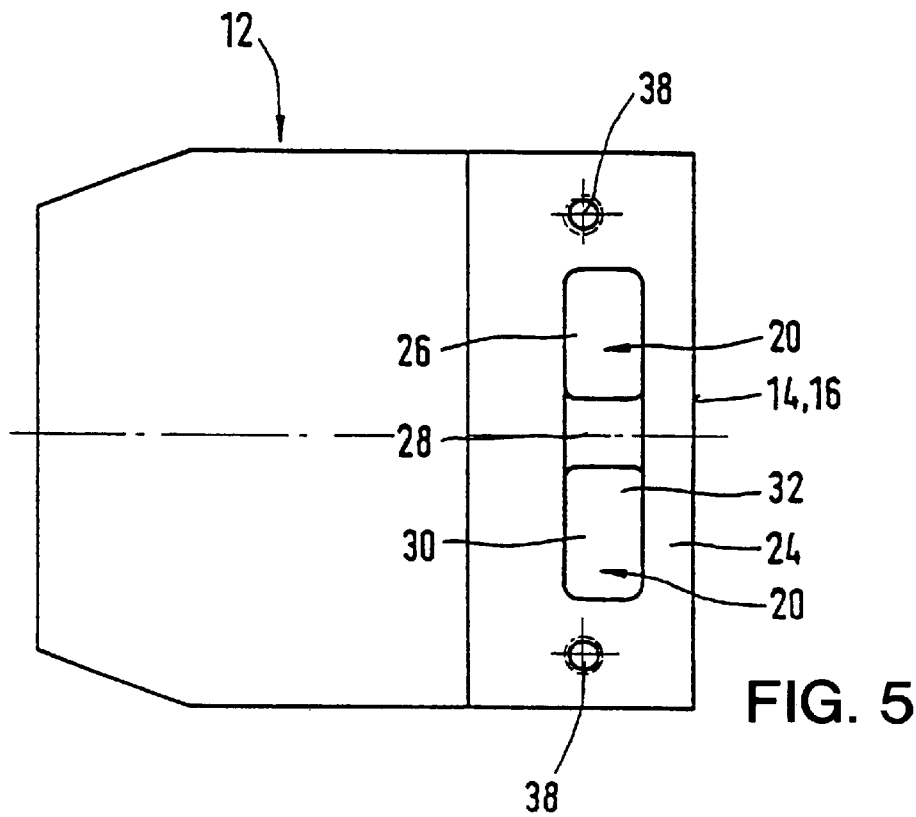
FIG. 5 is a view of the casting blank of the mold jaw half shown in FIG. 2 viewing in the direction of the arrow V, that is to say viewing from above.
Figure 6:
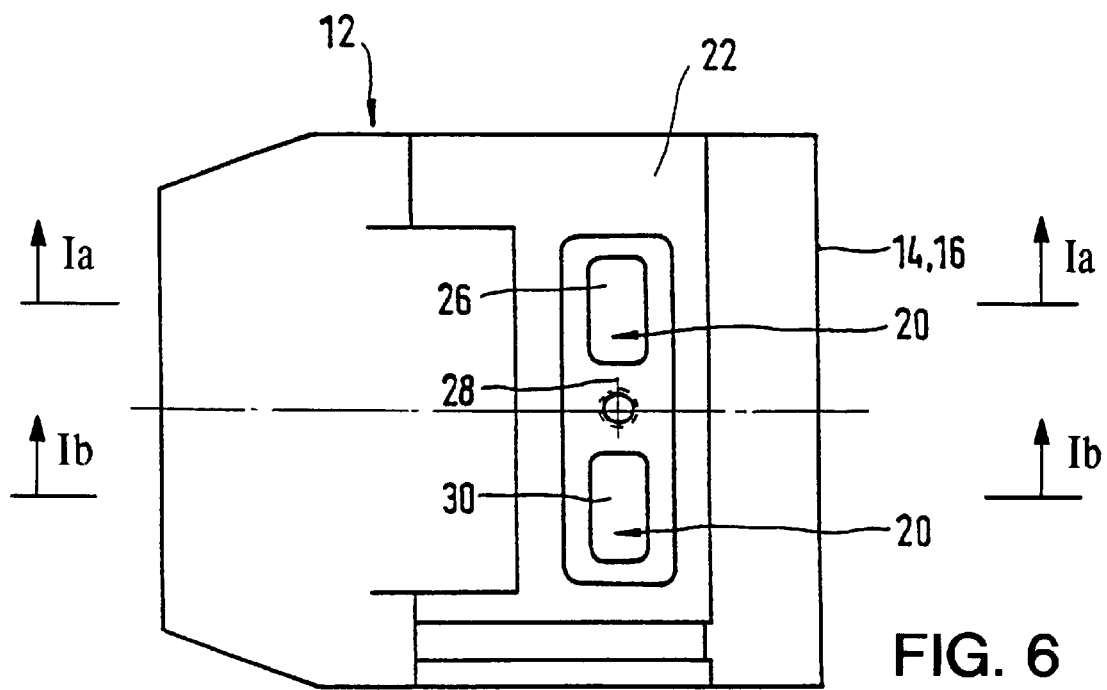
FIG. 6 is a view of the casting blank of the mold jaw half as shown in FIG. 2 viewing in the direction of the arrow VI, that is to say viewing from below.
Figure 7:
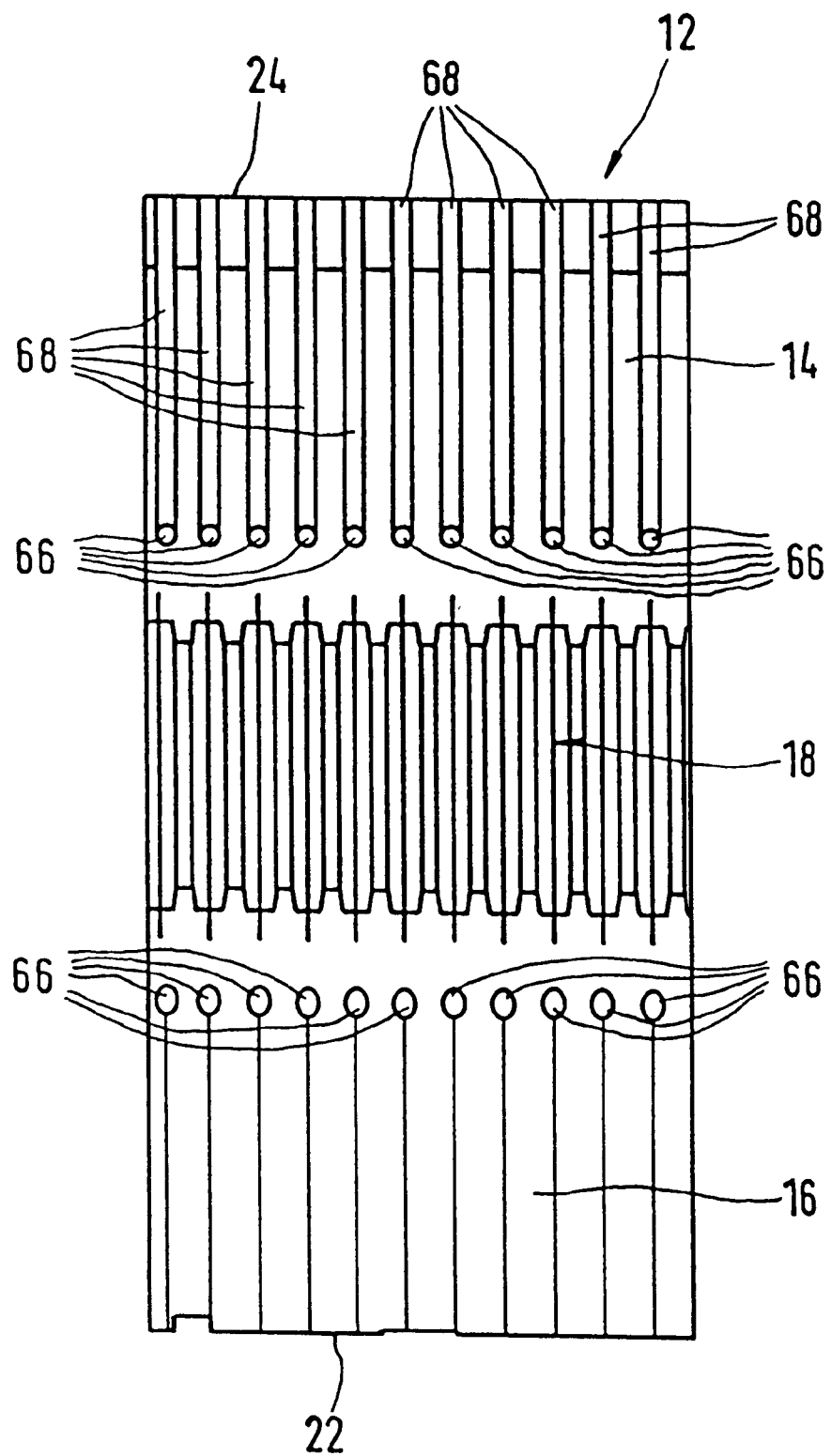
FIG. 7 is an end view of a mold jaw half as shown in FIG. 4 to illustrate the vacuum communication channels and the corrugated or ribbed mold passage.

As can also be seen from FIGS. 2 and 4, each mold jaw half 12 has a cooling passage 20. In the apparatus 10 according to the invention, the cooling passages 20 in the mold jaw halves 12 are preferably formed by so-called false casting cores which are provided in the appropriate casting mold for producing the mold jaw halves 12, in per se known manner. The cooling passage 20 of the respective mold jaw half 12 extends from a first surface 22 of the respective mold jaw half 12 to a second surface 24, which is different from the first surface 22, of the respective mold jaw half 12. As can be seen from FIG. 6 the cooling passage 20 of the respective mold jaw half 12 is provided at the first surface 22 with a cooling agent feed means 26 and with a cooling agent discharge means 30 which is spaced therefrom by a rib 28. As can be seen from FIGS. 1, 2 and 4 the respective rib 28 extends only into the proximity of the second surface 24 of the respective mold jaw half 12 so that in the proximity of the second surface 24 there is a connecting portion 32 which connects together the two cooling passage portions, of which one is associated with the cooling agent feed means 26 and the other is associated with the cooling agent discharge means 30. The common connecting portion 32 of the cooling passage 20 is sealingly closed off by means of a guide and slide element 34 which is fixed to the second surface 24 of the respective mold jaw half 12. That fixing action is afforded for example by screws, the center line of which is indicated in FIG. 1 by the thin dash-dotted lines 36. Those screws are screwed into screw holes 38 as are shown in FIG. 2 and in FIG. 5.

Along the common mold section, the mold jaw halves 12 are laterally guided without play at the top side by means of the associated guide and slide elements 34, against linear guide members 40.

Each mold jaw half 12 is releasably fixedly connected at its underside to an associated support element 44 by means of a quick-action clamping device 42. The support elements 44 are linearly movably guided along the common mold section of the apparatus 10 on a guide and cooling agent bar or rail 46 which has an elongate central cooling agent circulation portion 48 and two elongate oil-lubricated guide portions 50 which laterally adjoin the portion 48. The central cooling agent circulation portion 48 preferably comprises a sliding or bearing metal alloy such as bronze, and it is provided with cooling agent feed channels 52 and with cooling agent discharge channels 54. Extending through the support elements 44 are communicating passages 56 which provide for a fluid communication between the cooling agent feed channels 52 and the associated cooling agent feed means 26. The communicating passages 58 provide for a fluid communication between the cooling agent discharge means 30 of the respective mold jaw half 12 which is disposed in the common mold section of the apparatus 10.

Figure 1A:
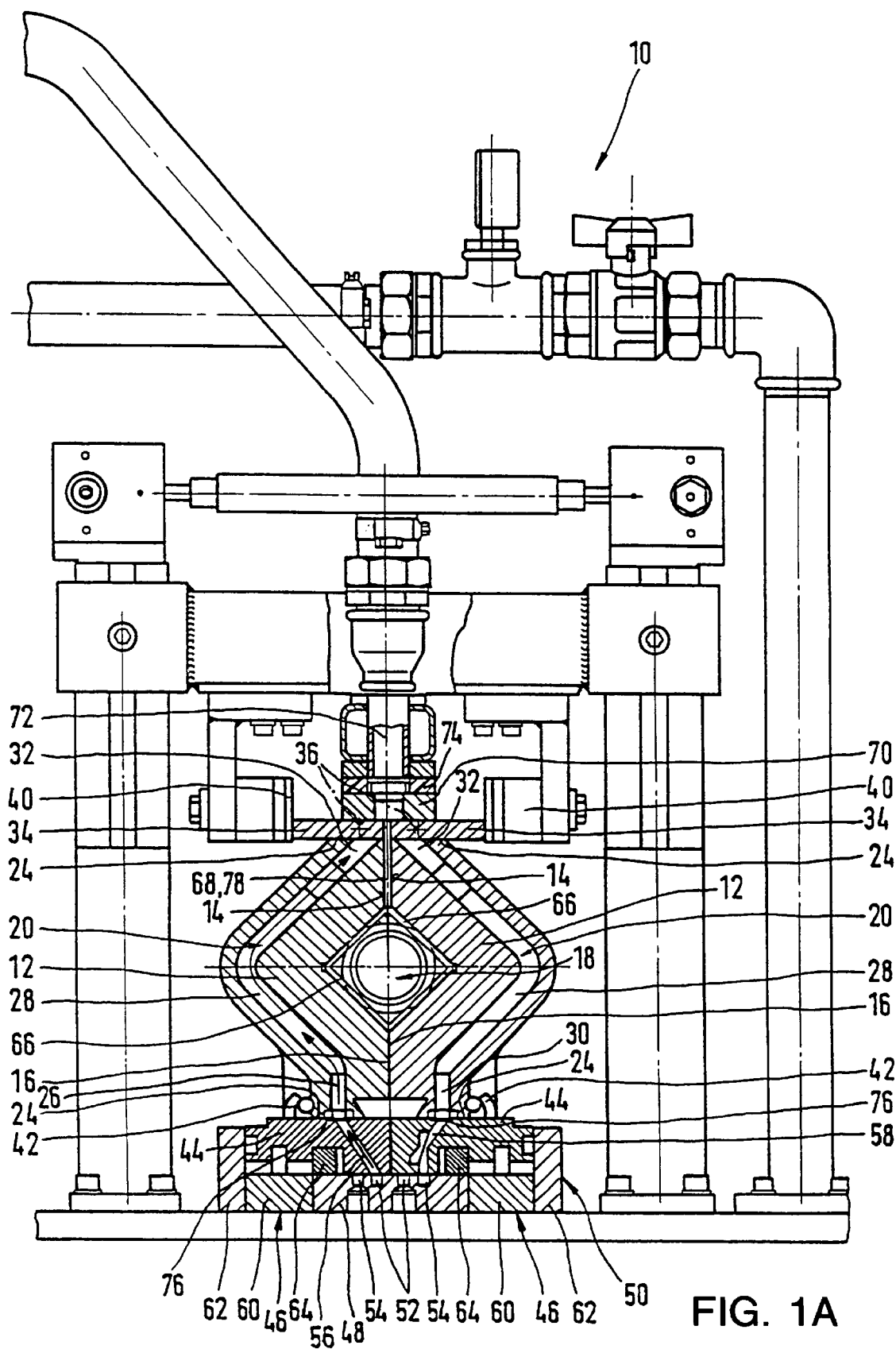
FIG. 1A is a cross-section along line 1a–1a of FIG. 6.
Figure 1B:
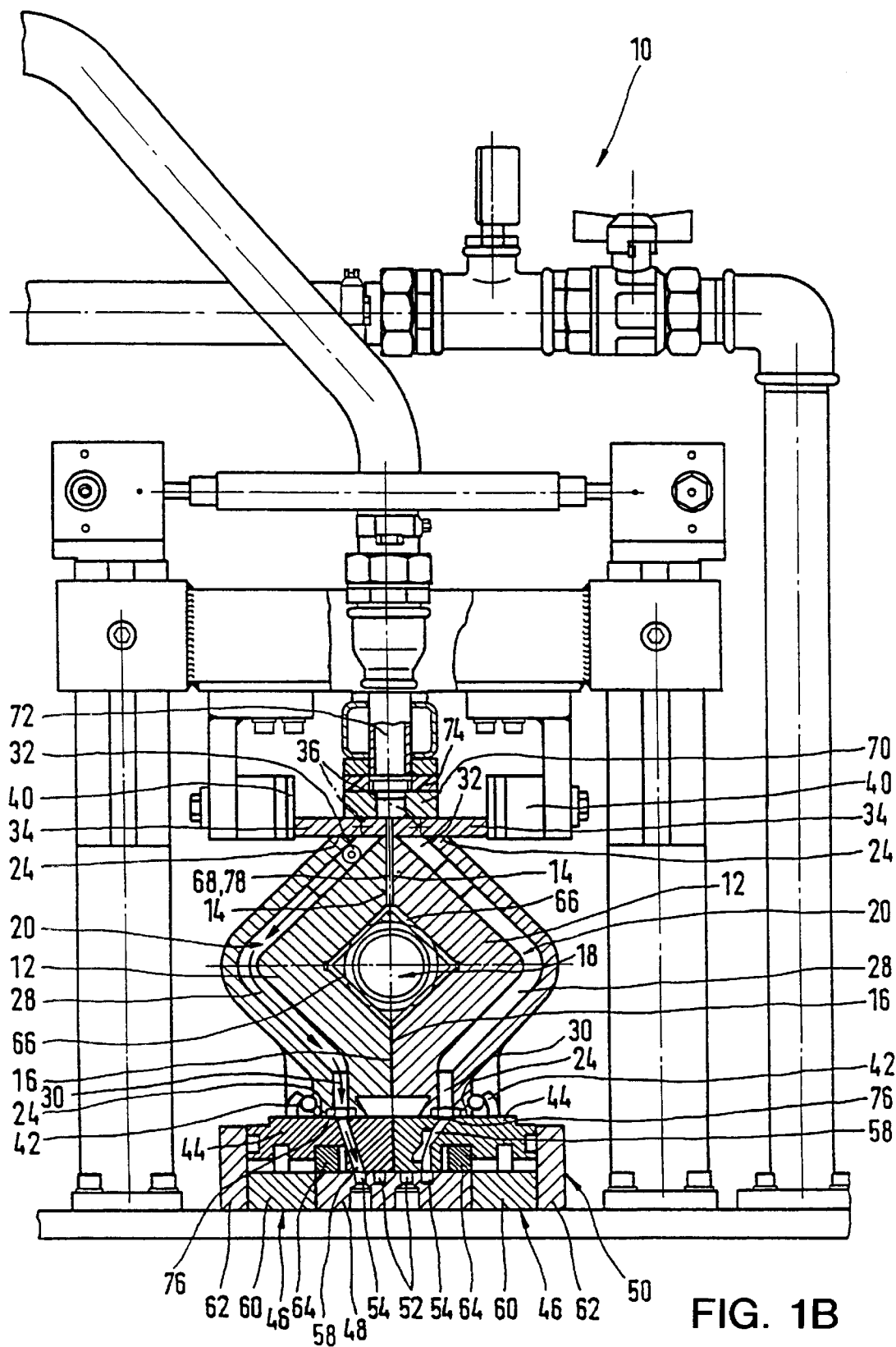
FIG. 1B is a cross-section along line 1b–1b of FIG. 6.

FIG. 1A shows the cooling agent feed means 26 in communication with the cooling passage of the respective (left) mold jaw half. The cooling agent feed means 26 is in communication with a cooling agent feed channel 52 by means of passage 56 which extends through support element 44. FIG. 1B shows cooling agent discharge means 30 of the respective mold jaw half 12 in communication with cooling passage 20 of the respective (left) mold jaw half. The cooling agent discharge means 30 is in communication with cooling agent discharge channel 54 by means of passage 58 which also extends through support element 44.

Each of the two lateral, oil-lubricated guide portions 50 has a horizontal bar or rail 60 and a vertical bar or rail 62 adjoining same. Like the support element 44 and the guide and slide elements 34, the horizontal and vertical bars or rails 60 and 62 desirably consist of high-quality steel. The mold jaw halves which are produced by casting and which are provided with the cooling passages 20 in the casing operation desirably comprise aluminum.

So that the oil-lubricated guide portions 50 are separated from the central cooling agent circulation portion 48, in relation to the lubricating oil present in that area, the apparatus has separating bars or rails 64. The separating bars or rails 64 reliably prevent lubricating oil from passing from the guide portions 50 to the central cooling agent circulation portion 48.

FIGS. 1 and 4 show that each mold jaw half 12 is provided with vacuum passages 66 which open into the mold passage 18. The front faces 14 of the mold jaw halves 12 are provided with vacuum communication channels 68 which are in flow communication with the vacuum passages 66 and which extend through the respectively associated guide and slide element, as can be seen from FIG. 1 and FIG. 4. At the side of the guide and slide elements 34, which is opposite to the mold jaw halves 12, a vacuum bar or rail 70 bears against the common mold section (see FIG. 1). The vacuum bar or rail 70 is elastically yieldingly mounted to a stationary vacuum head 72 by means of a plastic element 74. Mechanical tolerances in respect of height, and tolerances in respect of height which are caused by thermal expansion, in respect of the mold jaw halves 12, along the common mold section, can be compensated by means of the plastic element 74. The vacuum bar or rail 70 is pressed sealingly against the guide and slide elements 34 of the mold jaw halves 12 which are disposed in the common mold section, by the elastically yieldingly plastic element 74.

Provided between each mold jaw half 12 and the support element 44 which is detachably fixed to the underside of the mold jaw half 12 or the first surface 22 thereof, by means of the quick-action clamping device 42, is a respective sealing means 76 which ensures that, even after a set of mold jaw halves 12 has been replaced by another set of mold jaw halves 12 for producing different transversely ribbed tubes, reliable sealing integrity in respect of the cooling agent is guaranteed, between the mold jaw halves 12 and the support elements 44.

Figure 3:
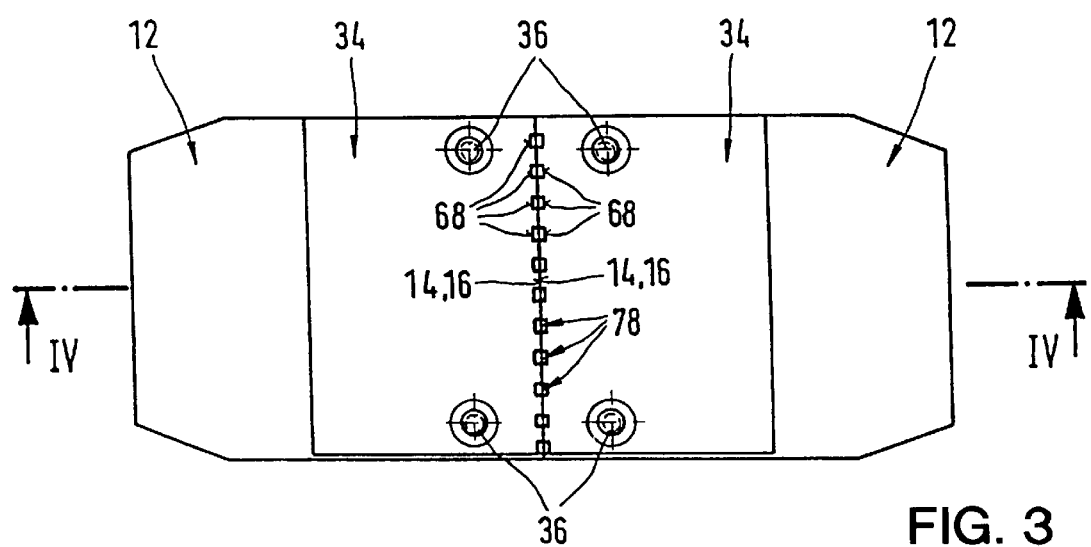
FIG. 3 is a plan view of two mold jaw halves which are disposed at the common mold section of the apparatus.

FIG. 3 shows two mold jaw halves 12 at the common mold section, wherein the vacuum communication channels 68 provided at the front faces 14 of the mold jaw halves 12 form respective vacuum communication passages 78.

The same details are identified in FIGS. 1 to 7 by the same respective reference numerals.

What is claimed is:

1. Apparatus for the production of transversely ribbed tubes, which comprises: mold jaw halves which bear against each other along a common mold section with front faces thereof and which form a mold passage, with each mold jaw half having a cooling passage; wherein the cooling passage of the respective mold jaw half is produced in a casting process and has at a first surface a cooling agent feed means, and at a spacing therefrom a cooling agent discharge means and, produced directly in the casting procedure, the cooling passage extends to a second surface of the corresponding mold jaw half which is different from the first surface; a guide and slide element fixed to the respective second surfaces by which the cooling passages are sealed off at the second surfaces; and wherein the first and second surfaces of the respective mold jaw halves are disposed in a mutually opposite relationship and are arranged in a mutually parallel relationship and are oriented substantially perpendicularly with respect to the front face of the respective mold jaw half.

2. Apparatus according to claim 1, wherein a respective mold jaw half is connected to a support element which is guided along the common mold section at a guide and cooling agent rail.

3. Apparatus according to claim 2, wherein the respective mold jaw half and the associated support element are connected together by means of a quick-action clamping device.

4. Apparatus according to claim 2, wherein a sealing means is provided between the respective mold jaw half and the associated support element.

5. Apparatus according to claim 1, wherein each mold jaw half is provided with vacuum communication channels at their front faces between the mold passage and the second surface which are in flow communication with vacuum passages that open into the mold passage, in the corresponding mold jaw half, and which are extended through the guide and slide element and form vacuum communication passages along the common mold section.

6. Apparatus according to claim 5, including a vacuum rail provided along the common mold section which is in flow communication by way of the vacuum communication passages with the vacuum passages of the respective mold jaw halves which are at the common mold section.

7. Apparatus according to claim 6, wherein the vacuum rail is elastically yieldingly mounted to a stationary vacuum head.

8. Apparatus according to claim 2, wherein the cooling agent rail is provided to guide the support elements associated with the respective mold jaw halves and is adapted for fluid communication through the support elements to the respective mold jaw halves which are at the common mold section with cooling agent feed channels and cooling agent discharge channels.

9. Apparatus according to claim 8, wherein the cooling agent rail has a central cooling agent circulation portion and, laterally adjoining same, oil-lubricated guide portions, wherein the cooling agent circulation portion is provided with the cooling agent feed channels and with the cooling agent discharge channels.

* * * * *